United States Patent

[11] 3,631,919

[72] Inventor Ralph D. Cooksley
         Westbrook, Conn.
[21] Appl. No. 813,570
[22] Filed Apr. 4, 1969
[45] Patented Jan. 4, 1972
[73] Assignee Thermaline Corporation
         Waterford, Conn.

[54] HEAT TRANSFER METHOD AND APPARATUS
     9 Claims, 2 Drawing Figs.
[52] U.S. Cl. ............................................. 165/1,
                                                       165/86
[51] Int. Cl. ........................................... F28d 11/00
[50] Field of Search ............................. 165/111,
                                                  86, 89, 1, 92, 113

[56] References Cited
         UNITED STATES PATENTS
2,311,984  2/1943  Guild ........................... 165/86

*Primary Examiner*—Charles Sukalo
*Attorney*—Prutzman, Hayes, Kalb & Chilton

ABSTRACT: Desalination apparatus for boiling salt water and condensing the resulting steam having a primary heat transfer unit with a twisted and spirally formed heat transfer tubular conduit for the salt water which is rotated within a steam chamber for heating the salt water while maintaining the salt water in the rotating tubular conduit substantially in its liquid state by the pressure increase resulting from its rotation. Steam emanating from the salt water heated by the primary heat transfer unit is conducted through a condenser having elongated inner and outer coaxial twisted tubes and through which the inlet salt water is conducted, thereby preheating the cold water while condensing the steam. The hot salt water residue from the primary heat transfer unit is conducted through a secondary heat transfer unit (like the condenser in construction) for preheating the inlet salt water further before it is conducted to the primary heat transfer unit.

INVENTOR
RALPH P. COOKSLEY

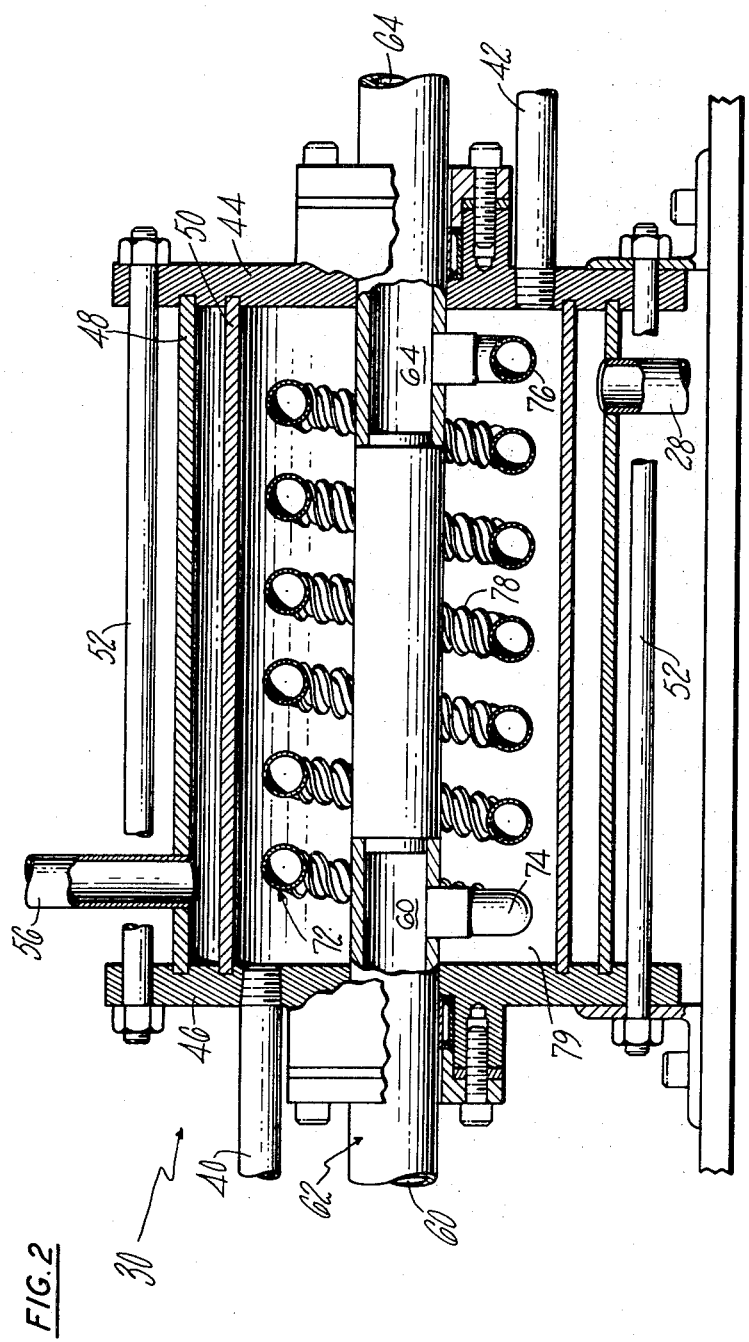

3,631,919

HEAT TRANSFER METHOD AND APPARATUS

BRIEF SUMMARY OF THE INVENTION

The present invention relates to improved heat transfer method and apparatus for transferring thermal energy between two fluids.

It is a principal object of the present invention to provide new and improved heat transfer method and apparatus for transferring thermal energy between fluids and which provide improved thermal conductivity between the fluids.

It is another object of the present invention to provide new and improved transfer method and apparatus which provide improved heat transfer within the fluids and improved scrubbing or wiping action of the fluids on the thermal conductor therebetween.

It is a still further object of the present invention to provide new and improved heat transfer method and apparatus for reducing the size and cost of equipment providing any desired rate of thermal energy transfer.

It is another object of the present invention to provide new and improved heat transfer method and apparatus useful for efficiently transferring thermal energy between gases (including both wet and dry steam), between liquids, or between a gas and a liquid.

It is a further object of the present invention to provide new and improved heat transfer method and apparatus for transferring thermal energy from or to a liquid which is approximately at its boiling point without diminishing the thermal conductivity due to pockets of vaporized liquid at the surface of the thermal conductor.

It is another object of the present invention to provide new and improved heat transfer method and apparatus for the continuous transfer of thermal energy between two fluids which provide for heat transfer to the energy receiving fluid with such fluid at a pressure above its inlet and outlet pressures.

It is another object of the present invention to provide new and improved heat transfer method and apparatus for boiling a liquid. For example, the heat transfer method and apparatus of the present invention has special application in desalination through the process of boiling salt water and condensing the resulting steam.

It is a further object of the present invention to provide new and improved heat transfer method and apparatus with which the rate of thermal transfer between two moving fluids is vastly improved by the dynamic forces of the moving fluids.

It is a still further object of the present invention to provide new and improved heat transfer apparatus which is useful for transferring thermal energy in either direction between two fluids.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 2 is a longitudinal elevation section view, partly broken away and partly in section, of a primary heat transfer unit of the heat transfer apparatus.

DESCRIPTION OF THE PREFERRED EMBODIMENT

Figure 1:
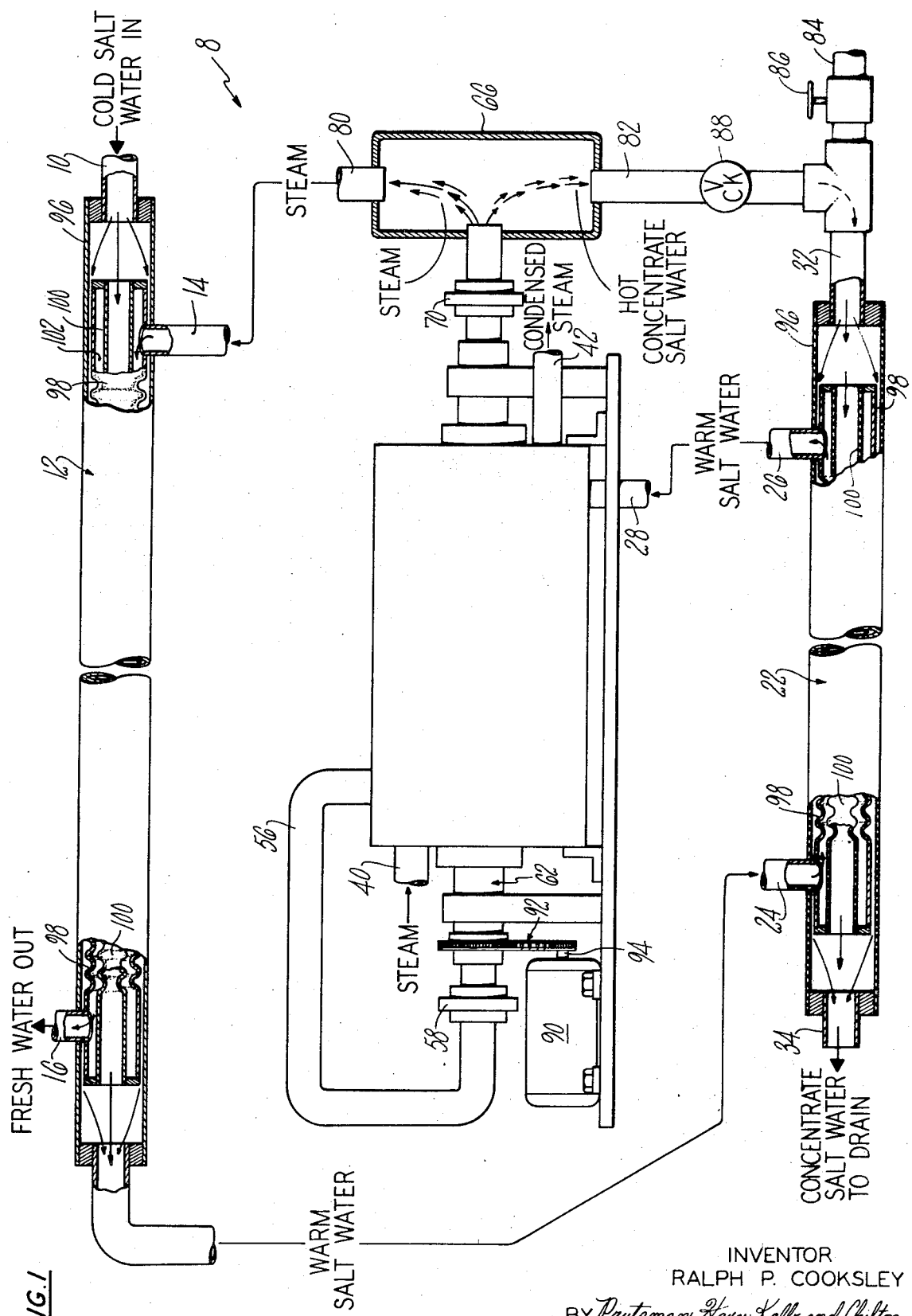
FIG. 1 is a generally schematic illustration, partly broken away and partly in section, of a heat transfer apparatus incorporating the present invention and employing the heat transfer method of the present invention.

Referring now to the drawings in detail wherein like numerals represent like parts, an embodiment of a heat transfer apparatus 8 incorporating the present invention and employing the heat transfer method of the present invention is shown being applied for converting salt water to fresh water through the process of boiling the salt water and condensing the resulting steam. An inlet pipe 10 of the apparatus provides for conducting inlet salt water from a suitable pump (not shown) to a condenser 12 where the inlet salt water is employed for condensing steam (generated as described hereinafter) conducted to the condenser via a steam inlet pipe 14 and discharged from the condenser as pure fresh water via an outlet pipe 16, it being understood that the condenser 12 functions to preheat the inlet salt water while condensing the steam.

The inlet salt water is preheated further by a secondary heat exchanger 22 having a salt water inlet pipe 24 and a salt water outlet pipe 26 connected to an inlet pipe 28 of a primary heat exchanger 30. Hot salt water residue or concentrate (hereinafter more fully explained) is conducted to the secondary heat exchanger 22 via an inlet pipe 32 for heating the salt water and is discharged from the heat transfer apparatus 8 via an outlet pipe 34.

Steam is admitted to the primary heat exchanger 30 via an inlet pipe 40 and is discharged from the primary heat exchanger 30 via an outlet 42 and preferably after the steam is condensed, in which case the primary heat exchanger 30 could also be employed as the primary condenser for condensing the steam of a separate closed system, for example a system in which the steam is used to drive a turbine or other power equipment.

The heat exchanger 30 comprises a stationary housing with a pair of coaxial circular end plates 44, 46, outer and inner coaxial cylindrical casings 48, 50 received within opposed circular recesses in the end plates, and tension rods 52 connecting the end plates. An annular water jacket formed between the coaxial cylinder casings 48, 50 provides for preheating the inlet salt water further, the inlet salt water being conducted through the jacket from the jacket inlet pipe 28 to the jacket outlet pipe 56.

The jacket outlet pipe 56 is connected via a suitable coupling 58 to an axial inlet passage 60 in one end of a shaft 62 rotatably mounted on the end plates 44, 46. The shaft 62 has an axial outlet passage 64 at its opposite end which is connected to a separator inlet pipe 66 via a suitable coupling 70, and a primary heat transfer conduit 72 having a pair of axially spaced connectors 74, 76 and a spiral tube 78 between the connectors 74, 76 provides a fluid connection between the inlet and outlet passages 60, 64.

Accordingly the steam conducted to the heat transfer chamber 79 within the inner casing 50 provides for heating the salt water passing through the primary heat transfer conduit 72, preferably so that a substantial percentage of the salt water will be converted to steam which is then separated from the remaining hot salt water concentrate or residue in the gravity separator 66, the steam being conducted from the separator 66 to the condenser 12 via a separator outlet pipe 80 and the salt water residue being conducted from the separator to the secondary heat exchanger 22 via a separator outlet pipe 82. Also, an auxiliary salt water inlet pipe 84 is provided for flushing the hot salt water residue through the secondary heat exchanger 22 where such is desirable, for which purpose a manual valve 86 is provided for selectively flushing the heat exchanger 22 and a one-way check valve 88 is provided for preventing backflow to the separator 66 when the valve 86 is open.

The shaft 62 and primary heat transfer conduit 72 form a rigid unit which is rotated by a suitable motor 90 through a chain and sprocket drive arrangement 92 interconnecting the shaft 62 and motor shaft 94. The salt water pressure in the tube 78 is thereby increased by the centrifugal force caused by the tube rotation. In addition the spiral tube 78 is formed, as by pretwisting the tube, with a plurality of helical convolutions providing alternate grooves and ridges within (and without) the tube which cause the salt water to travel helically around the inside surface of the tube 78 as it is conducted through the tube from the inlet passage 60 to the outlet passage 64, and the centrifugal force caused by such helical motion of the salt water produces an additional increase in the salt water pressure.

Preferably the salt water pressure increase from such centrifugal forces is sufficient to keep preferably at least a substantial portion of the salt water within the tube in its liquid state and preferably enough liquid to cover the entire inside irregular surface of the tube, so as to substantially reduce if not completely eliminate the formation of steam pocket on the inside surface of the tube and to thereby maintain a high rate of thermal conductivity. In addition the helical flow of the salt water within the tube will increase the scrubbing action on the inside surface of the tube 78 and turbulence within the tube which will increase the rate of heat transfer within the salt water through convection. Although as indicated it is preferred that at least a substantial portion of the salt water remains in the liquid state as it passes through the tube 78, the salt water will boil rapidly once it reaches the outlet passage 64, and the steam so formed will separate in the gravity separator 66 from the remaining residue or concentrate which is conducted to the secondary heat exchanger 22 to assist in preheating the inlet salt water.

Also, as previously indicated, it may be useful to use the heat exchanger 30 as a steam condenser for a separate steam system. In such instance, or in any case where condensation is present in the steam chamber 79, the condensation will form on the outer surface of the primary heat transfer tube 78. However, the spinning tube 78 will throw off such water particles and thereby maintain the high rate of heat transfer through the wall of the tube 78. In addition the spinning tube 78 will cause a scrubbing action on the external surface of the tube 78 and turbulence within the steam chamber 79, thereby increasing the rate of heat transfer through the wall of the tube 78 and increase the rate of heat transfer within the steam chamber through convection.

The condenser 12 and secondary heat exchanger 22 are similarly constructed with an elongated conduit 96 providing, in the condenser, for conducting the inlet salt water through the condenser, and in the secondary heat exchanger, for conducting the hot salt water residue through the exchanger. Inner and outer elongated twisted tubes 98, 100 respectively, are coaxially mounted within the conduit 96 to form a generally spiral intermediate passageway 102 for conducting the steam through the condenser 12 and the inlet salt water through the heat exchanger 22. The spiral fluid flow through the passageway 102 and around the inner and outer walls of the inner and outer tubes respectively, provides for increasing the scrubbing action on the walls of the twisted tubes and rate of thermal conductivity through the walls. In addition such spiral motion of the fluid provides for increasing the heat transfer within the fluids by convection.

It can be seen therefore that the method and apparatus of the present invention provide economical and efficient heat transfer means having utility in the desalination of water and, more generally, utility in heating a liquid to its boiling point with steam while maintaining a high rate thermal conductivity between the liquid and steam.

As will be apparent to persons skilled in the art, various modifications, adaptations and variations of the foregoing specific disclosure can be made without departing from the teachings of the present invention.

I claim:

1. A method of transferring thermal energy from steam to a second fluid comprising the steps of providing a fluid conduit for the second fluid having an outer heat transfer wall separating the second fluid from the steam, rotating the fluid conduit in the steam to increase the scrubbing action of the steam on the heat transfer wall and to reduce the formation of steam condensation on the heat transfer wall due to the combined effect of the scrubbing action and the centrifugal force produced by the rotating fluid conduit, and conducting the second fluid through the rotating fluid conduit.

2. The method of claim 1 wherein the second fluid is conducted through the rotating conduit with its highest temperature sufficiently low to provide that the second fluid remains substantially in its liquid phase in engagement with the outer heat transfer wall at its total pressure within the conduit produced in part by the pressure increase from the rotating conduit, and yet sufficiently high to provide that the second fluid is above its boiling point at its partial pressure, excluding the pressure increase from the rotating conduit, within the conduit.

3. A method of transferring thermal energy between first and second fluids, comprising the steps of providing a fluid conduit for the first fluid having a fluid inlet and outlet for conducting the first fluid therethrough and an outer heat transfer wall for separating the first fluid from the second fluid, rotating the fluid conduit, and conducting the first fluid through the rotating conduit with its highest temperature sufficiently low to provide that the first fluid remains substantially in its liquid phase in engagement with the outer heat transfer wall at its total pressure within the conduit produced in part by the pressure increase from the rotating conduit, and yet sufficiently high to provide that the first fluid is above the boiling point at its partial fluid pressure, excluding the pressure increase from the rotating conduit, within the fluid conduit.

4. The method of claim 3 wherein the fluid conduit comprises an elongated generally tubular conduit with said outer heat transfer wall, and wherein the first fluid is conducted generally helically through the tubular conduit to increase the scrubbing action and centrifugal force on the heat transfer wall.

5. In a heat exchanger comprising a fluid conduit with an inlet and outlet and an outer heat transfer wall for transferring thermal energy between a first fluid being conducted through the conduit from its inlet to its outlet and a second fluid separated from the first fluid by the heat transfer wall, mounting means for mounting the fluid conduit for rotation as the first fluid is being conducted therethrough, and nonrotatable fluid inlet and outlet ducts respectively mounted in association with the inlet and outlet of the fluid conduit to conduct the first fluid through the fluid conduit as the conduit rotates, the improvement wherein the fluid conduit comprises a generally spiral tube extending at a substantially constant radius from its axis of rotation.

6. The heat exchanger of claim 5 wherein the spiral tube has a generally twisted form with a plurality of generally spiral convolutions with alternate ridges and grooves.

7. The heat exchanger of claim 5 for transferring thermal energy from the second fluid through the outer heat transfer wall to the first fluid for converting, at least in part, the first fluid from its liquid phase to its gaseous phase, wherein the heat exchanger comprises motor means for rotating the fluid conduit to increase the fluid pressure of the first fluid as it is conducted through the fluid conduit to maintain the first fluid in substantially its liquid phase in engagement with the outer heat transfer wall.

8. In a heat exchanger comprising a fluid conduit with an inlet and outlet and an outer heat transfer wall for transferring thermal energy between a first fluid being conducted through the conduit from its inlet to its outlet and a second fluid separated from the first fluid by the heat transfer wall, the improvement wherein the fluid conduit comprises a generally spiral tube, and wherein the heat exchanger further comprises means for mounting the spiral tube for rotation as the first fluid is being conducted therethrough and with the spiral tube generally symmetrically about its axis of rotation.

9. The heat exchanger of claim 5 further comprising an enclosure for enclosing at least a portion of the fluid conduit and having an enclosure inlet and an enclosure outlet for conducting the second fluid therethrough, the enclosure comprising a fluid jacket with jacket inlet and outlet ports, and fluid connecting means for connecting one of said ports to one of said ducts to connect the fluid conduit and fluid jacket in series.

* * * * *